WIDE BAND REGULATED ELECTRONIC AMPLIFIER

Filed Sept. 15, 1961 2 Sheets-Sheet 1

INVENTOR.
RICHARD S. BURWEN
BY
Arthur H. Swenson
ATTORNEY.

May 4, 1965 R. S. BURWEN 3,182,268

WIDE BAND REGULATED ELECTRONIC AMPLIFIER

Filed Sept. 15, 1961 2 Sheets-Sheet 2

INVENTOR.
RICHARD S. BURWEN

BY Arthur H. Swanson

ATTORNEY.

United States Patent Office 3,182,268

Patented May 4, 1965

3,182,268
WIDE BAND REGULATED ELECTRONIC AMPLIFIER

Richard S. Burwen, Lexington, Mass., assignor to Honeywell Inc., a corporation of Delaware Filed Sept. 15, 1961, Ser. No. 138,314
11 Claims. (Cl. 330—10)

This invention relates to electronic apparatus, and more particularly, to electronic amplifiers.

It is an object of this invention to provide an improved electronic amplifier for the faithful amplification of a wide band of signals from direct current to relatively high frequency alternating current signals.

It is another object of this invention to provide an improved amplifier of the type set forth which is capable of handling relatively large power.

It is a further object of this invention to provide an improved electronic power regulator.

It is a still further object of this invention to provide a power regulator as set forth which is operable to produce either a regulated direct current or a regulated alternating current power output.

In accomplishing these and other objects, there has been provided, in accordance with the present invention a closed-loop electronic amplifier circuit employing semi-conductor circuitry. An input signal is amplified and applied to control a trigger circuit. The output of the trigger circuit is, in turn, applied to control a semi-conductor switching circuit. The switching circuit produces alternate positive and negative output pulses which are fed into an averaging network to produce an output signal which is a function of the pulse width modulation of the pulses from the switching circuit. A feedback circuit from the output of the switching circuit to the input of the system causes the system to oscillate, producing the pulsed output. The relative pulse widths are modulated in accordance with the applied input signal.

Figure 1:
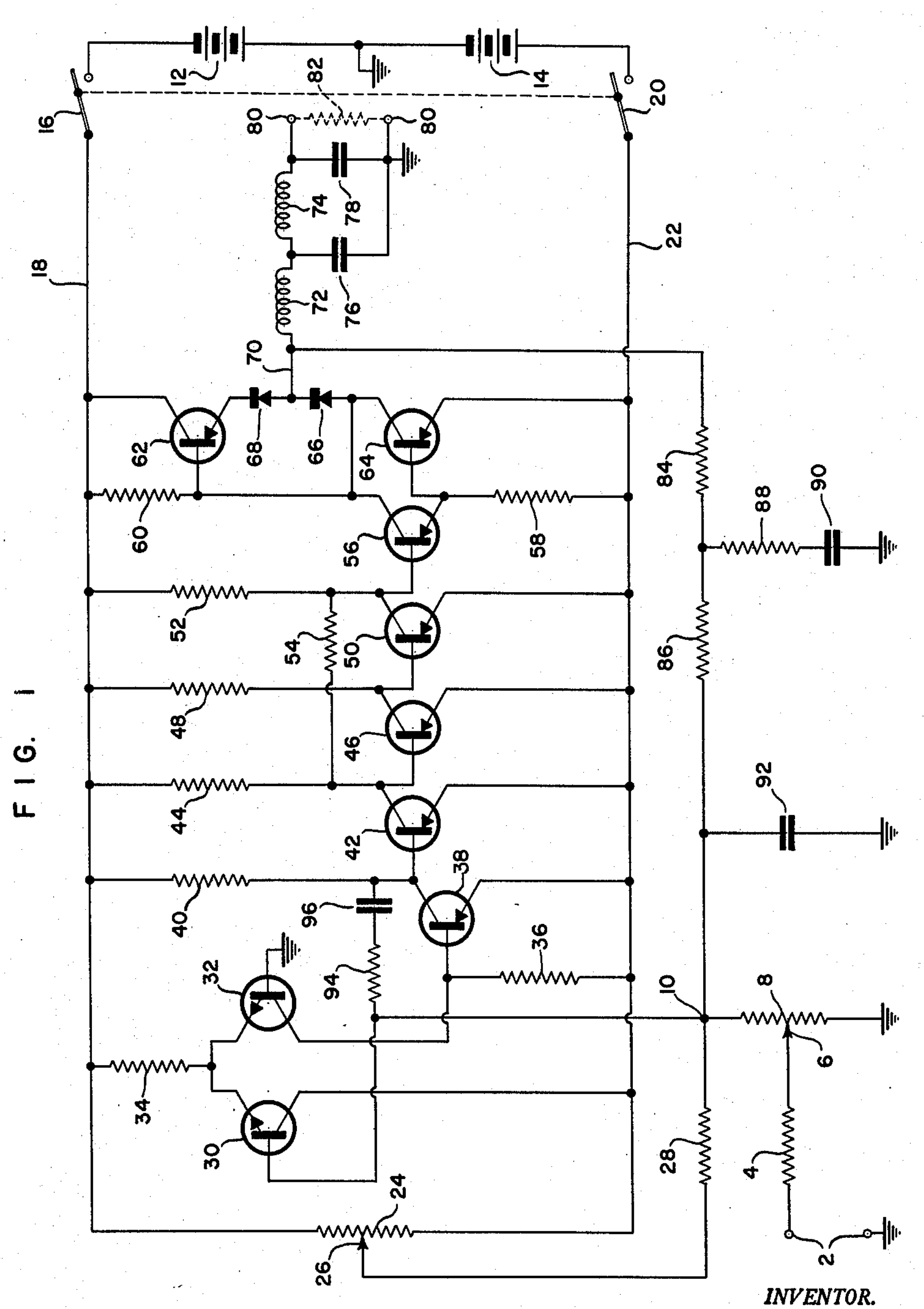
Figure 2:
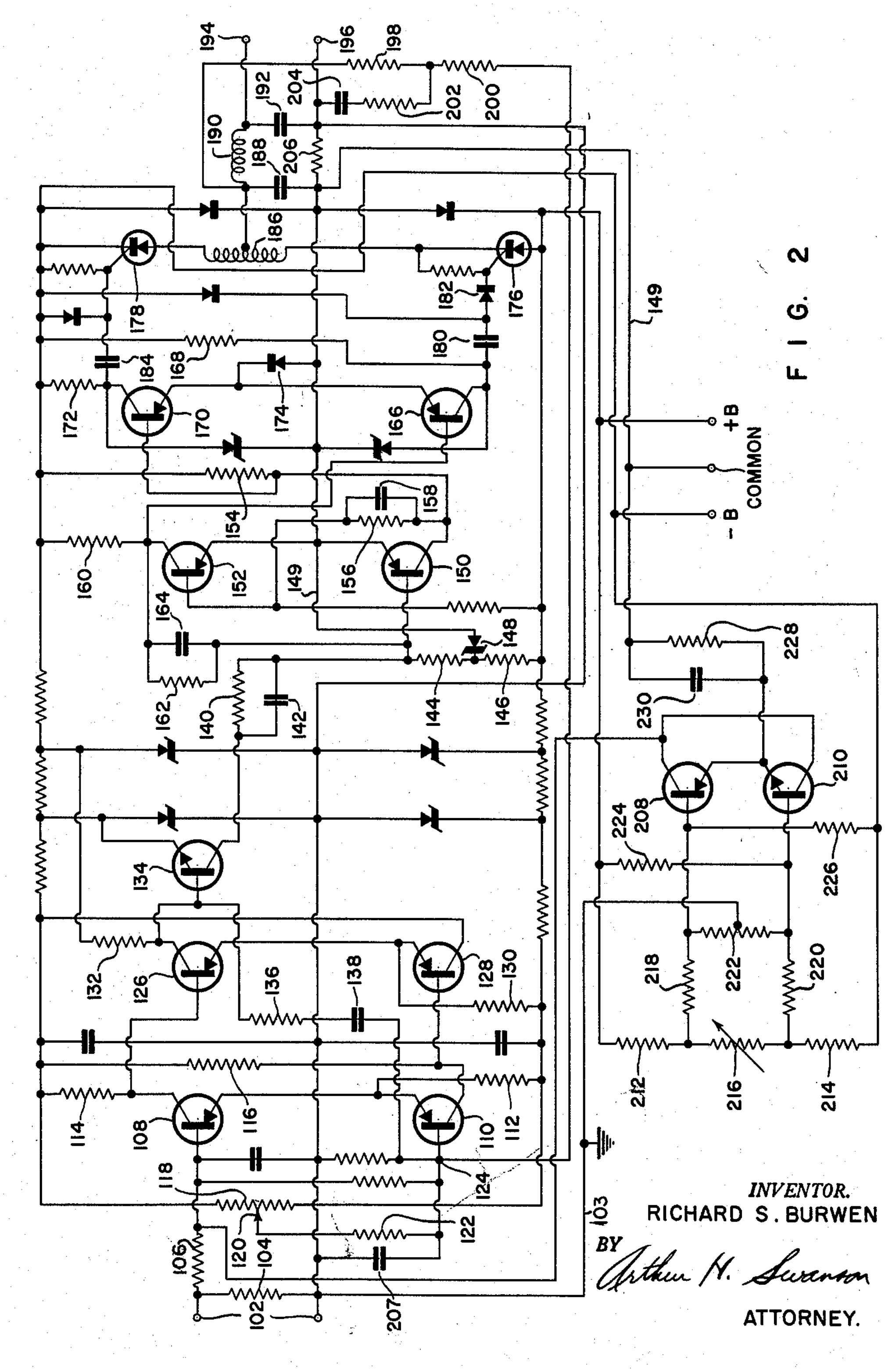

A better understanding of this invention may be had from the following detailed description when read in connection with the accompanying drawings, in which:

FIG. 1 is a schematic circuit diagram illustrating an embodiment of the present invention; and FIG. 2 is a schematic circuit diagram illustrating a somewhat different embodiment of this invention.

Referring now to the drawing in more detail, it may be seen in FIG. 1 that there has been provided a pair of input terminals 2, one of which is shown as being connected to ground. The other of the input terminals is connected through an input resistor 4 to the slider 6 of a gain-control potentiometer 8. The resistor of the potentiometer 8 is connected, at one end, to ground and at the other end to a junction point 10. A power supply is represented by a pair of batteries 12 and 14 serially connected and with the center point grounded. A first switch 16 is serially connected between the battery 12 and a negative potential supply bus 18. A second switch 20 is similarly serially connected between the battery 14 and a positive potential supply bus 22. The extreme ends of the two supply buses are connected to opposite ends of a slidewire resistor 24. A slider 26 cooperatively associated with the resistor 24 is connected through a resistor 28 to the junction 10.

A pair of transistors 30 and 32 are connected in a differential amplifier configuration. Of these, the first transistor 30 has a collector electrode connected directly to the positive bus 22 and an emitter connected through a resistor 34 to the negative bus 18. The base or control electrode of the transistor 30 is connected directly to the junction 10. The emitter of the second transistor 32 is connected directly to the emitter of the transistor 30. Thus, the resistor 34 constitutes a common emitter resistor for the two transistors. The base of the second transistor is connected directly to ground. The collector of the transistor 32 is connected through a load resistor 36 to the positive bus 22. The output signal from the transistor 32, developed across the load resistor 36 is applied as input signal to the base electrode of a transistor 38. This transistor has its emitter connected directly to the positive bus 22 and its collector connected through a load resistor 40 to the negative bus 18. The output of this transistor 38, developed across the load resistor 40 is applied as input signal to the base electrode of a second stage transistor 42 which also has its emitter connected directly to the positive bus and its collector connected, through a load resistor 44, to the negative bus 18. The output of that transistor 42, developed across the load resistor 44, is applied as input to the first of two transistors which constitutes the active elements of a flip-flop circuit. The first flip-flop transistor 46 has its base connected to the collector output of the transistor 42, its emitter connected directly to the positive bus 22 and its collector connected, through a load resistor 48 to the negative bus 18. The second flip-flop transistor 50 is similarly connected with its base electrode connected to the collector of the preceding transistor 46, its emitter is connected directly to the positive bus 22, and its collector connected, through a load resistor 52 to the negative bus 18. A feedback resistor 54 is connected between the collector of the transistor 50 and the base of the transistor 46. The output or collector electrode of the transistor 50 is connected to the base of a control transistor 56. This transistor 56 has its emitter connected through a first load resistor 58 to the positive bus 22, and its collector connected through a second load resistor 60. Thus connected, this transistor 56 serves as a so-called phase-splitter for the output signals from the flip-flop transistor 50. The output of the transistor 56 is applied to control, alternately, the actuation of a pair of switching semi-conductor devices. These devices are here shown as transistors 62 and 64, but it should be understood that other controlled semi-conductor devices such as silicon controlled rectifiers may well be substituted for these transistors. More specifically, the collector of the transistor 56 is connected directly to the base or control electrode of the semi-conductor switching device represented by the transistor 62, the collector of which is connected directly to the negative bus 18. The emitter of the transistor 56 is connected directly to the base or control electrode of the semi-conductor switching device represented by the transistor 64, the emitter of which is connected directly to the positive bus 22. The collector of the transistor 64 is connected, through a pair of series connected rectifiers 66 and 68 to the emitter of the transistor 62. A connection is also made between the collector of the transistor 56 to the collector of the switching transistor 64.

The point of junction between the two rectifiers 66 and 68 is connected to an output lead 70 which, in turn, feeds into an averaging circuit. The averaging circuit includes a pair of series connected inductance coils 72 and 74 and a pair of shunt connected capacitors 76 and 78. A pair of system output terminals 80 are connected to the output leads of the averaging circuit, one of these output terminals being shown as connected to ground. An output load device is represented by a resistor 82, shown dotted, connected across the two system output terminals. The output at these terminals 80 is, as will be explained hereinafter, a faithful reproduction of the input signal, amplified.

From the lead 70, before the averaging circuit, a feedback loop is connected. This loop includes a first feedback resistor 84 and a second feedback resistor 86 serially connected between the lead 70 and the junction 10. The junction between the resistors 84 and 86 is connected, through a third resistor 88 and a series capacitor 90, to ground. A further capacitor 92 is connected between the junction 10 and ground. At the junction 10, the feedback signal is superimposed in negative feedback relation to the input signal supplied from the input terminals 2 and the bias adjustment signal supplied from the potentiometer 24. A further negative feedback signal is connected between the collector of the transistor 38, through a resistor 94 and a capacitor 96, and the junction 10.

The operation of this circuit may now be considered. Ignoring, for the moment any input signal such as would be applied from the terminals 2, when the switches 16 and 20, shown ganged, are closed and power from the batteries 12 and 14 is applied to the circuit, the system breaks into oscillation through the operation of the flip-flop relationship of the transistors 46 and 50 and at a frequency determined by the loop gain of the amplifier and time constants of the feedback loop. Tracing through the circuit, any signal appearing at the junction 10 is applied to the input of the transistor 30, the first transistor of the differential pair. This differential pair provides a measure of gain to the input signal without a phase reversal. It also provides means for self-compensating for any appreciable change in the operating characteristics of the input stage due to temperature drift. The output of the differential pair is applied to the two stages of straight amplification represented by the transistors 38 and 42. The two transistors 46 and 50 with the associated positive feedback loop including the resistor 54 comprise a flip-flop. Thus, the output of the transistor 50 appears as substantially a square wave alternating between a positive and negative value.

When the output of the transistor 50 is at a positive value, the transistor 56 is biased to cutoff. This produces a positive signal at the base of the switching transistor 64, rendering that transistor non-conductive. At the same time a negative signal is produced at the base of the switching transistor 62, rendering that transistor conductive. Under this condition, current flows from the battery 12 through the transistor 62 and the diode 68 to produce a negative pulse at the output lead 70.

When the flip-flop has changed its condition to produce an output having a negative value, the transistor 56 will be biased into conduction, reversing the conductivity relationship of the two switching transistors 62 and 64. Thus, transistor 62 is rendered non-conductive and the transistor 64 becomes conductive. Under this condition, current flows from the battery 14 through the transistor 64 and the diode 66 to produce a positive pulse at the output lead 70. If the circuit is so adjusted that, in the absence of an input signal, the positive pulses are equal in duration or width to the negative pulses, then a series of such pulses, applied to the output averaging circuit, produces a net signal across the output terminals 80 of zero. Similarly the pulse signals, as they appear at the output lead 70, are applied to the negative feedback loop where the signals are also average or integrated, primarily by the capacitor 92; the resistors 84, 86, and 88, the capacitor 90, as well as the resistor 94 and the capacitor 96 serving primarily as phase adjusting means to control the characteristics of the feedback signal. All of these elements in the feedback loop contribute to establishing and stabilizing the pulse repetition rate or oscillation frequency of the circuit. While, as noted, the feedback signal is also averaged or integrated, a small amount of ripple remains in the signal applied to the junction 10. These ripple peaks are amplified and applied in negative feedback relation to trigger the flip-flop circuit to its opposite state of conduction. Repetition of this relationship produces the oscillatory action of the circuit.

If, now, a direct current signal is superimposed upon the system at the junction 10, this signal is amplified by the differential pair transistors 30 and 32 and the two direct coupled amplifier stages 38 and 42. This applies a bias signal to the control electrode of the first flip-flop transistor 46, off-setting the proportionality of the resultant positive and negative pulses and effecting such offset in either direction depending upon the polarity of the direct current signal. Thus, a positive input signal will cause a shift in relative pulse width such as to make the negative pulses of longer duration than the positive pulses. When these pulses are applied to the averaging circuit, there is a net signal of negative polarity produced across the output terminals 80. It should also be noted that the amount by which the proportionality of the pulses is shifted, linearly follows the magnitude of the input signal. Accordingly, the net output signal after averaging is a faithful reproduction of the input signal.

Similarly, a negative signal superimposed at the junction 10 produces a shift in the operation which results in the positive pulses being of longer duration, thereby producing a net positive signal at the output terminals 80.

These direct current signals superimposed at the junction 10 may well be produced by moving the slider 26 along the slide wire 24 to produce a constant input signal of selected polarity and magnitude. With such a signal applied at the junction 10, the input terminals 2 may be disregarded and the circuit becomes a well regulated direct-current power supply.

On the other hand, with the slider 26 properly centered on the slidewire, the superimposed signals may be variable signals applied to the input terminals 2. These, too, will cause the relative widths of the positive and negative pulses to be shifted in accordance with the magnitude and direction of the applied signal. This results in an output signal at the terminals 80 which, again, faithfully follows the input signal.

In a circuit constructed in accordance with this invention, the pulse repetition rate or frequency of oscillation was on the order of 250 kilocycles per second. While a small amount of frequency modulation occurs, the principal effect is that of pulse width modulation. Inasmuch as the system responds to input signals of either polarity to produce corresponding output signals, it should be apparent that the signals applied at the input terminals 2 may also be alternating current signals. In the aforesaid constructed circuit, alternating current signals of a frequency up to 30 kilocycles per second were accommodated and faithfully amplified. If, now, the signals supplied to the input terminals 2 are obtained from a source such as an audio oscillator, the system becomes a well regulated alternating-current power-supply.

When, for the output switching devices here represented as transistors 62 and 64, a pair of silicon controlled rectifiers is used, it will be appreciated that considerably more power can be effectively handled and controlled by this circuit.

An example of another amplifier circuit embodying the present invention and employing controlled semi-conductor rectifiers is shown in FIG. 2. This circuit is, in many respects, similar to the circuit shown in FIG. 1. An input signal is applied to a pair of input terminals 102. One of these input terminals is connected to a system common ground bus 103. The other of the input terminals is connected, through an input resistor 106 to the base electrode of a transistor 108. This transistor is the first transistor of a differential pair, the second of which is the transistor 110. The emitters of these two transistors are connected together and through a common emitter resistor 112 to a positive potential power supply lead. The collector of the transistor 108 is connected through a load resistor 114 to a negative potential power supply lead. Similarly, the collector of the transistor 110 is connected through a load resistor 116 to the negative potential supply lead. Between the positive potential supply lead and the negative potential supply lead is connected the resistance element of a slidewire 118. The slider 120 which cooperates with the slidewire 118 is connected, through a resistor 122, to a junction 124. The junction 124 is connected directly to the input or base electrode of the transistor 110.

The structure thus far is quite similar to that shown in FIG. 1 with the principal exception that the base of the second transistor of the differential pair, instead of being grounded as in the FIG. 1 circuit, is connected to the junction 124. The action is, however, substantially the same since the two transistors are differentially connected.

The second stage of amplification differs from that shown in FIG. 1 in that, here, the second stage is also differentially connected. Thus, the output of the transistor 108 is directly coupled to the input or base electrode of a transistor 126 while the output of the transistor 110 is directly connected to the input or base electrode of a transistor 128. The emitters of these two transistors are connected together and through a common emitter resistor 130 to the positive potential power supply lead. The collector of the transistor 126 is connected through a load resistor 132 to the negative potential power supply line. The collector of the transistor 128 is connected directly to the negative potential power supply line. The output of the transistor 126 is taken as the output of the differential pair and is directly connected to the input or base electrode of a transistor 134. The output of the transistor 126 is also connected in negative feedback relation, through a resistor 136 and a capacitor 138 to the junction 124. The emitter of the transistor 134 is connected directly to the negative supply line. The collector of this transistor is connected through a first resistor 140, having a capacitor 142 connected in parallel therewith, a second resistor 144 and a third resistor 146 to the positive supply line. The junction between the resistor 144 and the resistor 146 is connected, through a Zener diode 148 to the common center line 149 of a three-wire power supply source.

The junction between the resistor 140 and the resistor 144 is connected to apply the output signal from the transistor 134 as a control signal to a transistor flip-flop circuit. The flip-flop circuit includes a first transistor 150 and a second transistor 152. The input signal is applied to the base electrode of the first transistor 150. The collector of this transistor is connected, through a load resistor 154 to the negative supply line. The output of the transistor 150 is connected, through a parallel arrangement of a resistor 156 and a capacitor 158, to the base electrode of the second transistor 152. The collector electrode of the transistor 152 is connected, through a load resistor 160, to the negative supply line. From the collector of the transistor 152, there is a positive feedback connection to the base of the transistor 150. This connection includes a resistor 162 having a capacitor 164 connected in parallel therewith. The emitters of the transistors 150 and 152 are both connected to the common line 149.

An output signal is taken from the collector of the transistor 152 and applied directly to the base electrode of a first switching transistor 166. The collector of the transistor 166 is connected, through a load resistor 168, to the negative supply line. Similarly, an output signal is taken from the collector of the transistor 150 and applied directly to the base electrode of a second switching transistor 170. The collector of the transistor 170 is connected, through a load resistor 172, to the negative supply line. The emitters of these two transistors are connected together and through a bias diode 174, to the common line 149.

The switching action of the two transistors 166 and 170 is used to produce a pair of alternate control pulses to trigger a pair of controlled rectifiers 176 and 178. Thus, the output of the transistors 166 is coupled, through a capacitor 180 and a diode 182, to the control electrode of the controlled rectifier 176. The output of the transistor 170 is coupled, through a capacitor 184, to the control electrode of the controlled rectifier 178. The anode of the controlled rectifier 176 is connected directly to the positive supply line while the cathode of the controlled rectifier 178 is connected directly to the negative supply line. The cathode of the controlled rectifier 176 is connected to one end of a center-tapped autotransformer 186. The opposite end of the autotransformer 186 is connected to the anode of the controlled rectifier 178. The center tap of the autotransformer is connected to the output circuit of the system through an averaging network. This averaging network comprises a first capacitor 188 connected between the center tap of the transformer and the common line 149, an inductive choke 190 connected in series with the output, and a second capacitor 192 connected between the first output terminal 194 and the second output terminal 196, the second output terminal being directly connected to the lower input terminal 102 by the ground bus 103.

A feedback circuit is connected to the center tap of the transformer 186 and includes a first series resistor 198 and a second series resistor 200. The junction between the two series resistors is connected through a resistor 202 and a capacitor 204 to the ground bus 103. The end of the resistor 200 opposite from this common junction is connected to the junction 124 at the input to the transistor 110. This circuit is connected to apply signals to the input of the system in negative feedback relation.

It will be noticed that the output terminal 196, hence the ground bus 103, is isolated from the common line 149 by a resistor 206. This resistor 206 is a very small resistor connected in the output circuit to provide a control signal for an output limiting circuit. In order to protect the apparatus from possible damage due to overload or short-circuited output, means are proivded for limiting the output current of the system to a predetermined safe level. For example, in a circuit constructed in accordance with this invention, the predetermined safe level output limit was set at fifteen amperes and the resistor 206 had a value of 0.1 ohm.

The current limiting control circuit includes a pair of transistors 208 and 210 connected in a complementary symmetry configuration. A first resistor 212 has one end connected directly to the positive supply line. A second resistor 214 has one end connected directly to the negative supply lead. A variable resistor 216 is connected between the ends of the resistors 212 and 214 remote from the supply line connections. From the junction between the resistors 212 and 216, there is a connection through a resistor 218, to the base or input electrode of the transistor 208. Similarly, from the junction between the resistors 214 and 216, there is a connection, through a resistor 220, to the base or input electrode of the transistor 210. A center tapped resistor 222 is connected between the base of the transistor 208 and the base of the transistor 210. The center tap of the resistor 222 is connected to the ground bus 103. Another resistor 224 is connected between the positive supply line and the base of the transistor 210. A similar resistor 226 is connected between the negative supply line and the base of the transistor 208. The collectors of the two transistors 208 and 210 are connected together and to the input or base of the transistor 108. The emitters of the two transistors 208 and 210 are connected together and, through a resistor 228 having a shunt capacitor 230, to the common line 149.

The proper bias and power supply voltage levels for the several stages of this circuit have been accomplished through the use of dropping resistors and zener diodes at the various points as needed.

In operation, the circuit illustrated in FIG. 2 works much in the same manner as that illustrated in FIG. 1. With no signal applied at the input, as soon as power is applied to the circuit from the power supply source B, the system breaks into oscillation producing a train of symmetrical square waves at the output center tap on the autotransformer 186. As before, the symmetry of these square waves is adjusted by the positioning of the slider 120 on the slidewire 118.

It will be recalled that the negative feedback circuit delivers a signal to the junction 124 which includes small peaks or pips representative of the reversals in the square wave output. These pips are applied to the differential amplifier stages and to the single ended driver stage 134 for amplification. Remembering that each pip arrives in opposite phase to the condition that produced the pip, the amplified pip applied to the input of the flip-flop causes the flip-flop, transistors 150 and 152, to reverse their condition of conductivity. Assume, for the moment, that the reversal caused the transistor 152 to become non-conductive and the transistor 150 to become conductive. This produces a relatively negative signal on the input or base of the transistor 166 rendering it conductive and a relatively positive signal on the base of the transistor 170 rendering it non-conductive. The conduction of the transistor 166 produces a relatively positive signal at the collector thereof. This, in turn, delivers a positive pulse through the D.C. blocking capacitor 180, which is passed by the diode 182 to the control electrode of the controlled rectifier 176. The positive pulse causes the controlled rectifier 176 to become conductive. This conduction allows current to flow from the positive supply line, through the rectifier 176, through the lower half of the transformer 186, through the averaging circuit, to the output terminal 194, through the load (not shown), to the terminal 196, through the resistor 206, back to the common line 149 of the power supply. The initial flow of the current through the lower half of the autotransformer 186 produces a negative pulse at the upper end thereof. This negative pulse is sufficient to extainguish or terminate the conduction of the controlled rectifier 178.

This reversal in conductivity, in turn, causes a pip or pulse to be transmitted, through the negative feedback circuit, to the input of the system. That pip again causes a reversal in the conductivity condition of the flip-flop circuit, this time causing the transistor 152 to be conductive and the transistor 150 to be non-conductive. This produces a relatively negative signal on the base of the transistor 170 rendering it conductive while a relatively positive signal is applied to the base of the transistor 166 rendering it non-conductive. The conduction of the transistor 170 produces a relatively positive pulse across the capacitor 184, which pulse is applied to the control electrode of the controlled rectifier 178. This pulse renders the rectifier 178 conductive. The conduction of the rectifier 178 allows current to flow from common line 149 of the power supply, through the resistor 206, to the terminal 196, through the load (not shown), to the terminal 194, through the averaging circuit through the upper portion of the autotransformer 186, through the rectifier 178, to the negative supply line. The initial current flow through the upper portion of the autotransformer 186, cause a positive pulse to be produced at the lower end thereof. This positive pulse extinguishes the previously conducting controlled rectifier 176.

These reversals in conductivity condition continue as long as the power is applied to the circuit. In this manner, a train of alternately positive and negative square wave pulses appear at the center tap of the transformer 186 at a repetition rate determined, as before, by the circuit parameters. So long as the pulses are symmetrical about zero, the net signal, after the averaging circuit, at the output terminals is zero. If a net difference signal is applied across the input to the first differential amplifier, the symmetry of the output signals is upset, as in the circuit of FIG. 1, producing a net output signal which is a faithful, amplified reconstruction of the input signal.

It will be recalled, that output signal currents were drawn through the resistor 206. This current produces a relatively small voltage drop across this resistor 206.

It is to be noted that the emitters of the two transistors 208 and 210 are effectively connected to one side of the resistor 206, while the center tap of the resistor 222, connected between the bases of these two transistors is connected to the other side of the resistor 206. If the current flow through the load, hence through the resistor 206, is within the prescribed limits, the bias signal across this resistor has no appreciable effect on the current limiting circuit. If, however, the current through the resistor 206 exceeds the prescribed limit, the bias signal developed thereacross causes the transistors 208 and 210 to conduct so as to effectively short-circuit the amplifier input circuit, thus reducing the output current.

Thus it may be seen that there has been provided, in accordance with the present invention, an improved electronic amplifier capable of faithfully amplifying a wide band of signals from direct current to relatively high frequency alternating current signals, which is capable of functioning as a regulated source of either direct-current or alternating-current power.

What is claimed is:

1. An electronic power control circuit comprising a closed-loop amplifier having as an output stage a pair of signal controlled semi-conductor switching elements, each of said switching elements being operable to switch between a conducting state and non-conducting state, said amplifier including a negative potential supply line, a positive potential supply line and a common return line, one of said semi-conductor switching elements being connected between said negative potential supply line and said common return line, the other of said semi-conductor switching elements being connected between said positive potential supply line and said common return line, said amplifier further including means connected to said switching elements for generating and applying control signals to said switching elements for cyclically and oppositely actuating said switching elements between said conducting state and said non-conducting state, said amplifier including a negative feedback loop and means for determining the frequency of said control signals hence of the actuation of said switching means, at least a part of said frequency determining means being included in said feedback loop, control means included in said amplifier for controlling the symmetry of said control signals in accordance with an input condition thereby controlling the relative time duration of the conducting state of one of said switching elements with respect to the time duration of the conducting state of the other of said switching elements during each cycle of actuation, and an output circuit means connected in said common return line responsive to said actuation of said elements to produce an output signal corresponding to said input condition.

2. An electronic power control circuit comprising an amplifier having as an output stage a pair of signal controlled semi-conductor switching elements, each of said switching elements being operable to switch between a conducting state and non-conducting state, said amplifier including a negative potential supply line, a positive potential supply line, and a common return line, one of said semi-conductor switching elements being connected between said negative potential supply line and said common return line, the other of said semi-conductor switching elements being connected between said positive potential supply line and said common return line, said amplifier further including circuit means connected to said switching elements for developing and applying control signals selectively to said switching elements for cyclically and oppositely actuating said switching elements between said conducting state and said non-conducting state, said circuit means including a flip-flop circuit for developing said control signals, a negative feedback loop connected around said amplifier, said flip-flop circuit being keyed by signals from said feedback loop, time-constant means at least partly included in said feedback loop for determining the frequency of operation of said flip-flop circuit, means for controlling the symmetry of actuation of said flip-flop circuit in accordance with an input condition thereby controlling the relative time duration of the conducting state of one of said switching elements with respect to the time duration of the conducting state of the other of said switching elements during each cycle of actuation, and an output circuit means connected in said common return line responsive to said actuation of said elements to produce an output signal corresponding to said input condition.

3. An electronic power control circuit comprising an amplifier having as an output stage a pair of signal controlled semi-conductor switching devices, an output circuit connected to said switching devices, each of said switching devices being operable to switch between a conducting state and a non-conducting state, said amplifier including a negative potential supply line, a positive potential supply line and a common return line, one of said semi-conductor switching elements being connected between said negative potential supply line and said common return line, the other of said semi-conductor switching elements being connected between said positive potential supply line and said common return line, said amplifier further including circuit means conected to said switching devices for developing and applying control signals selectively to said switching devices for cyclically and oppositely actuating said devices between said conducting state and said non-conducting state, said circuit means including a flip-flop circuit for developing said control signals, a negative feedback loop connected around said amplifier, said flip-flop circuit being keyed by signals applied thereto through said feedback loop from said output circuit, time-constant means at least partly included in said feedback loop for determining the frequency of operation of said flip-flop circuit, and control means including an input circuit for said amplifier for controlling the symmetry of actuation of said flip-flop circuit in accordance with an input condition thereby controlling the relative time duration of the conducting state of one of said switching devices with respect to the time duration of the conducting state of the other of said switching devices during each cycle of actuation in accordance with an input condition, said output circuit being connected in said common return line and including means responsive to said actuation of said switching devices to produce an output signal corresponding to said input condition.

4. An electronic power control circuit comprising an amplifier having as an output stage a pair of signal controlled switching transistors, an output circuit connected to said transistors, each of said transistors being operable to switch between a conducting state and a non-conducting state, said amplifier including a negative potential supply line, a positive potential supply line, and a common return line, one of said switching transistors being connected between said negative potential supply line and said common return line, the other of said switching transistors being connected between said positive potential supply line and said common return line, said amplifier further including circuit means connected to said switching transistor for developing and applying control signals selectively to said transistors for cyclically and oppositely actuating said transistors between said conducting state and said non-conducting state, said circuit means including a flip-flop circuit for developing said control signals, a negative feedback loop connected around said amplifier, said flip-flop circuit being keyed by signals applied thereto through said feedback loop from said output circuit, time-constant means at least partly included in said feedback loop for determining the frequency of operation of said flip-flop circuit, and control means including an input circuit for said amplifier for controlling the symmetry of actuation of said flip-flop circuit in accordance with an input condition thereby controlling the relative time duration of the conducting state of one of said transistors with respect to the time duration of the conducting state of the other of said transistors during each cycle of actuation in accordance with an input condition, said output circuit being connected in said common return line and including means responsive to said switching transistors to produce an output signal corresponding to said input condition.

5. An electronic power control circuit comprising an amplifier having as an output stage a pair of silicon controlled rectifiers, an output circuit connected to said rectifiers, said rectifiers being operable in response to applied control signals to switch between a conducting state and a non-conducting state, said amplifier including a negative potential supply line, a positive potential supply line and a common return line, one of said rectifiers being connected between said negative potential supply line and said common return line, the other of said rectifiers being connected between said positive potential supply line and said common return line, said amplifier further including circuit means connected to said rectifiers for developing and applying control signals selectively to said rectifiers for cyclically and oppositely actuating said rectifiers between said conducting state and said non-conducting state, said circuit means including a flip-flop circuit for developing said control signals, a negative feedback loop connected around said amplifier, said flip-flop circuit being keyed by signals applied thereto through said feedback loop from said output circuit, time-constant means at least partly included in said feedback loop for determining the frequency of operation of said flip-flop circuit, and control means including an input circuit for said amplifier for controlling the symmetry of actuation of said flip-flop circuit in accordance with an input condition thereby controlling the relative time duration of the conducting state of one of said rectifiers with respect to the time duration of the conducting state of the other of said rectifiers during the cycle of actuation in accordance with an input condition, said output circuit being connected in said common return line and including means responsive to said actuation of said rectifiers to produce an output signal corresponding to said input condition.

6. An electronic power amplifier comprising an amplifier circuit having as an output stage a pair of signal controlled switching transistors, an output circuit connected to said transistors, each of said transistors being operable to switch between a conducting state and a non-conducting state, said amplifier including a negative potential supply line, a positive potential supply line, and a common return line, one of said transistors being connected between said negative potential supply line and said common return line, the other of said transistors being connected between said positive potential supply line and said common return line, said amplifier further including circuit means connected to said switching transistors for developing and applying control signals selectively and alternately to said transistors for cyclically and oppositely actuating said transistors between said conducting state and said non-conducting state, said circuit means including a flip-flop circuit for developing control signals, a negative feedback loop connected around said amplifier circuit to form a closed-loop system, said flip-flop circuit being keyed by signals applied thereto through said feedback loop from said output circuit, time-constant means at least partly included in said feedback loop for determining the frequency of operation of said flip-flop circuit, and means including a signal input circuit for said amplifier for controlling the symmetry of actuation of said flip-flop circuit in accordance with the input signal thereby controlling the relative time duration of the conducting state of one of said transistors with respect to the time duration of the conducting state of the other of said transistors during each cycle of actuation in accordance with an input signal, said output circuit being connected in said common return line and including means responsive to said actuation of said transistors to produce an amplified output signal corresponding to said input signal.

7. An electronic power amplifier comprising an amplifier circuit having as an output stage a pair of silicon controlled rectifiers, an output circuit connected to said rectifiers, each of said rectifiers being operable in response to applied control signals to switch between a conducting state and a non-conducting state, said amplifier including a negative potential supply line, a positive supply line and a common return line, one of said rectifiers being connected between said negative potential supply line and said common return line, the other of said rectifiers being connected between said positive potential supply line and said common return line, said amplifier further including circuit means connected to said rectifiers for developing and applying control signals selectively and alternately to said rectifiers for cyclically and oppositely actuating said rectifiers between said conducting state and said non-conducting state, said circuit means including a flip-flop circuit for developing said control signals, a negative feedback loop connected around said amplifier circuit forming a closed-loop system, said flip-flop circuit being keyed by signals applied thereto through said feedback loop from said output circuit, time-constant means at least partly included in said feedback loop for determining the frequency of operation of said flip-flop circuit, and control means including a signal input circuit for said amplifier for controlling the symmetry of actuation of said flip-flop circuit in accordance with an input signal thereby controlling the relative time duration of the conducting state of one of said rectifiers with respect to the time duration of the conducting state of the other of said rectifiers during each cycle of actuation in accordance with an input signal, said output circuit being connected in said common return line and including means responsive to the actuation of said rectifiers to produce an amplified output signal corresponding to said input signal.

8. An electronic power amplifier system comprising a signal input circuit, an amplifier circuit connected to said input circuit, and an output circuit connected to said amplifier circuit, said amplifier circuit having as an output stage, a pair of signal controlled semi-conductor switching devices, said amplifier including a negative potential supply line, a positive potential supply line, and a common return line, one of said semi-conductor switching devices being connected between said negative potential supply line and said common return line, the other of said semi-conductor switching devices being connected between said positive potential supply line and said common return line, said amplifier further including control means connected to said semi-conductor switching devices for selectively and alternately actuating said switching devices to render said switching devices alternately and cyclically conductive to produce a normally symmetrical square wave signal, said control means including a negative feedback loop connected between said output circuit and said input circuit, time-constant means included at least in part in said feedback loop for determining the frequency of atlernation of the actuation of said switching devices, said control means including means responsive to input signals from said input circuit for modulating the actuation of said switching devices to produce an asymmetrical square wave, the asymmetry of which is proportional to said input signals, and signals averaging means included in said output circuit to produce an output signal correspondinf to said input signal, said output circuit being connected in said common return line.

9. An electronic power amplifier system comprising a signal input circuit, an amplifier circuit connected to said input circuit, and an output circuit connected to said amplifier circuit, said amplifier circuit having as an output stage a pair of silicon controlled rectifier switching devices, said amplifier including a negative potential supply line, a positive potential supply line and a common return line, one of said silicon controlled rectifier switching devices being connected between said negative potential supply line and said common return line, the other of said silicon controlled rectifier switching devices being connected between said positive potential supply line and said common return line, said amplifier further including control means connected to said rectifier switching devices for selectively and alternately actuating said rectifiers to render said rectifiers alternately and cyclically conductive to produce a normally symmetrical square wave signal, said control means including a negative feedback loop connected between said output circuit and said input circuit, time constant means included at least in part in said feedback loop for determining the frequency of alternation of the actuation of said rectifiers, said control means including means responsive to input signals from said input circuit for modulating the actuation of said rectifiers to produce an asymmetrical square wave the asymmetry of which is proportional to said input signal, and signal averaging means included in said output circuit to produce an output signal corresponding to said input signal, said output circuit being connected in said common return line.

10. A semi-conductor switching circuit comprising a negative potential supply line, a positive potential supply line, a common return line, a first silicon controlled rectifier having its anode connected to said positive potential supply line, a second silicon controlled rectifier having its cathode connected to said negative potential supply line, an autotransformer having a pair of end connections and a center tap, one end connection of said autotransformer being connected to the cathode of said first rectifier, the other end connection of said autotransformer being connected to the anode of said second rectifier, an output circuit connected between said center tap on said autotransformer and said common return line, and control signal means for alternately biasing said rectifiers into conduction connected to said silicon controlled rectifiers.

11. An electronic power amplifier system comprising a signal input circuit, an amplifier circuit connected to said input circuit, a output circuit connected to said amplifier, said amplifier including a negative potential supply line, a positive potential supply line, a common return line, a first silicon controlled rectifier having its anode connected to said positive potential supply line, a second silicon controlled rectifier having its cathode connected to said negative potential supply line, an autotransformer having a pair of end connections and a center tap, one end connection of said autotransformer being connected to the cathode of said first rectifier, the other end connection of said autotransformer being connected to the anode of said second rectifier, said output circuit being connected between said center tap of said autotransformer and said common return line, control means for selectively and alternately actuating said rectifiers to render said rectifiers alternately and cyclically conductive to produce a normally symmetrical square wave signal, said control means including a negative feedback loop connected between said output circuit and said input circuit, time constant means included at least in part in said feedback loop for determining the frequency of alternation of the actuation of said rectifiers, said control means including means responsive to input signals from said input circuit for modulating the actuation of said rectifiers to produce an asymmetrical square wave the asymmetry of which is proportional to said input signal, and signal averaging means included in said output circuit to produce an output signal corresponding to said input signal.

References Cited by the Examiner

UNITED STATES PATENTS 2,266,401 12/41 Reeves ____________ 332—14 X
2,999,155 9/61 Masonson __________ 329—192 X ROY LAKE, *Primary Examiner.*

NATHAN KAUFMAN, *Examiner.*